(12) United States Patent
Vogler et al.

(10) Patent No.: US 8,579,383 B2
(45) Date of Patent: Nov. 12, 2013

(54) FASTENING ELEMENT FOR FIXATION OF A WHEEL ON A WHEEL AXLE

(75) Inventors: Manfred Vogler, Salzburg (AT); Hubert Lechner, Ebbs (AT); Siegfried Buchauer, Schwoich (AT)

(73) Assignee: Viking GmbH, Langkampfen (AT)

( * ) Notice: Subject to any disclaimer, the term of this patent is extended or adjusted under 35 U.S.C. 154(b) by 27 days.

(21) Appl. No.: 13/217,353

(22) Filed: Aug. 25, 2011

(65) Prior Publication Data
US 2012/0049612 A1    Mar. 1, 2012

(30) Foreign Application Priority Data

Aug. 27, 2010 (EP) ..................................... 10008906

(51) Int. Cl.
*B60B 37/10*    (2006.01)
(52) U.S. Cl.
USPC ...................................... 301/121; 301/111.01
(58) Field of Classification Search
USPC ................. 301/111.01, 111.04, 112, 121, 122
See application file for complete search history.

(56) References Cited

U.S. PATENT DOCUMENTS

| 5,222,786 | A | | 6/1993 | Sovis et al. | |
|---|---|---|---|---|---|
| 5,716,107 | A | * | 2/1998 | Parker et al. | 301/111.07 |
| 5,902,018 | A | * | 5/1999 | Owen et al. | 301/111.04 |
| 6,280,001 | B1 | * | 8/2001 | Parker et al. | 301/112 |
| 6,328,320 | B1 | * | 12/2001 | Walski et al. | 280/47.26 |
| 6,637,835 | B2 | * | 10/2003 | Morris | 301/111.01 |

FOREIGN PATENT DOCUMENTS

DE    38 11 757 A1    10/1989

\* cited by examiner

*Primary Examiner* — Jason Bellinger
*Assistant Examiner* — Jean Charleston
(74) *Attorney, Agent, or Firm* — Gudrun E. Huckett

(57) ABSTRACT

A fastening element for fixation of a wheel on a wheel axle has a first section and a second section that are movable relative to each other and are separated from each other by a plane of separation. The first section has devices for fixation on the wheel axle. The second section has a wheel axle cover. A substantially closed outer wall that is divided by the plane of separation is provided on the fastening element.

15 Claims, 6 Drawing Sheets

FASTENING ELEMENT FOR FIXATION OF A WHEEL ON A WHEEL AXLE

BACKGROUND OF THE INVENTION

The invention relates to a fastening element for fixation of a wheel on a wheel axle, wherein the fastening element has means for fixation on the wheel axle and means for fixation on the wheel.

DE 38 11 757 A1 discloses a fastening element for fixation of a wheel on a wheel axle; the fastening element is secured on the wheel axle and the wheel is subsequently pushed across and then clipped to the fastening element. The fastening element is completely covered by the outer wall of the wheel so that the fastening element must be released from the inner side. Sufficient mounting space must be available in order to be able to do this.

It is therefore an object of the present invention to provide a fastening element for fixation of a wheel on a wheel axle of the aforementioned kind that enables a substantially closed surface of the wheel and that requires only minimal mounting space.

SUMMARY OF THE INVENTION

In accordance with the present invention, this object is achieved in that the fastening element comprises two sections that are movable relative to each other and that are separated from each other at a plane of separation, wherein on the first section the means (devices) for fixation of the fastening element on the wheel axle and on the second section a wheel axle cover is arranged.

It is provided that the fastening element has a wheel axle cover. In this way, the fastening element can be arranged from the exterior on the wheel and can thus cover the wheel axle. The wheel axle cover and the means (devices) for fixation of the fastening element on the wheel axle are positioned conventionally in axial alignment (are axially overlapping each other) so that they cannot be molded without problems by an injection molding process. By configuring the fastening element with two sections that are movable relative to each other, it is possible to produce the fastening element with the wheel axle cover and the means (devices) for fixation of the fastening element on the wheel axle by injection molding in a simple way. In the injection mold the sections are arranged such that no areas are positioned so as to cover or overlap each other. Subsequently, the sections are folded against each other or placed against each other and the fastening element can be mounted. In this way, a simple configuration and simple manufacture are enabled while only minimal mounting space is required.

Advantageously, the fastening element has a substantially closed (continuous) outwardly facing outer wall that is divided by the plane of separation. The configuration of the outer wall as a substantially closed surface prevents deposition of dirt or the like; an appealing appearance is provided also in this way. The plane of separation is advantageously arranged such that it divides the outer wall. In this way, a simple constructive configuration of the fastening element is provided. Advantageously, the fastening element has a locking rim for fixation on a groove of the wheel axle. The wheel axle cover and the locking rim advantageously cover or overlap each other, at least partially, in perpendicular direction relative to the outer wall. The overlap in perpendicular direction, i.e., in axial direction relative to the wheel axle, provides for a favorable arrangement. Because the fastening element comprises two sections, the manufacture of the fastening element with such an overlap is possible in a simple way. Advantageously, the locking rim has an approximately elliptical inner contour. In this way, a safe fixation in the groove is achieved. At the same time, release of the fastening element from the wheel axle is simplified because the locking rim essentially must be released in the most narrow area of the ellipsis from the groove.

The fastening element has advantageously a receptacle for the end section of the wheel axle. The wheel axle is thus arranged in the area of the fastening element, namely in the area of the wheel axle cover. The wheel axle cover provides advantageously also a boundary of the receptacle. The locking rim is advantageously connected by means of a support wall with the outer wall formed on the first section of the fastening element. In this connection, the support wall advantageously delimits also the receptacle for the end section of the wheel axle at least partially. The support wall is advantageously secured exclusively on the first section of the fastening element. In this way, the areas of the support wall that are arranged in the area of the second section are more flexible. In particular, the support wall has a slot in the area that is adjacent to the second section. On either side of the slot, actuating sections are advantageously arranged that are inclined away from each other in a direction toward the outer wall. By means of the actuation sections, the support wall can be widened or expanded and in this way the locking rim can be released from the groove of the wheel axle. In order to enable in a simple way a release of the fastening element from the wheel axle, it is provided that the outer wall has an engagement opening adjacent to the actuating sections.

For attachment on the wheel, it is provided that the fastening element has at least one of locking hook. In particular, the plane of separation divides a locking hook. Advantageously, the fastening element has a support rim as a stop for the outer ring of a roller bearing. In this way, by means of the fastening element at the same time a roller bearing with which the wheel is supported on the wheel axle can also be positionally secured. The fastening element is comprised in particular of plastic material and is produced by injection molding.

Advantageously, the fastening element is formed as a monolithic part. In this way, a simple configuration and only a few individual parts are provided. Since the two fastening elements are movable relative to each other, despite the monolithic configuration a simple manufacture by injection molding can be realized. However, it may also be provided that the two sections are formed as separate parts that are resting against each other in the plane of separation. The two parts of the fastening element can be provided in particular with means for connecting them to each other. The connecting means (connecting device) for connecting them with each other can be, for example, a hinge, a snap-on connection or the like. However, it may also be provided that the two sections rest loosely against each other and by mounting on the wheel axle are secured on each other in their position.

DESCRIPTION OF THE PREFERRED EMBODIMENTS

Figure 1:
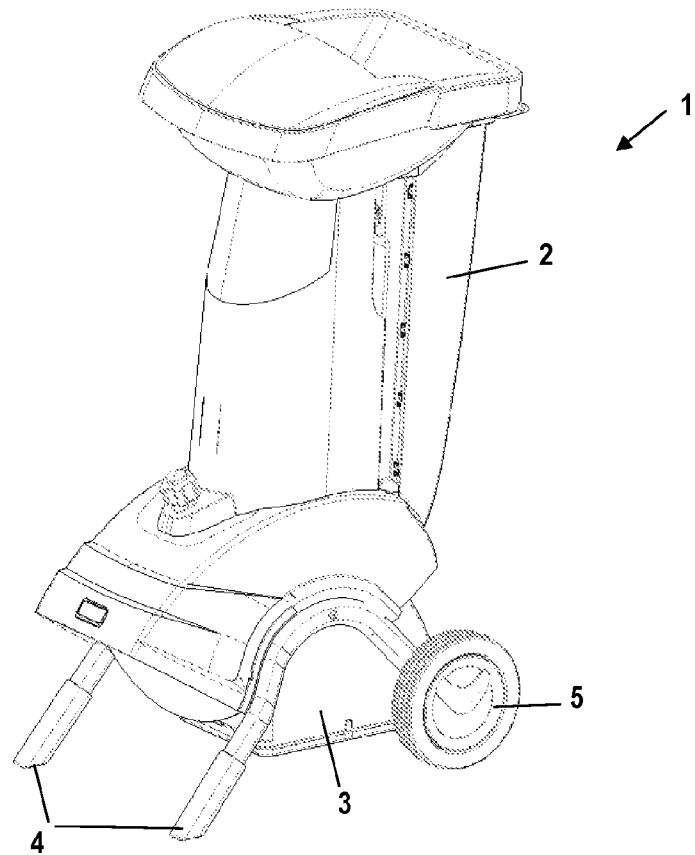
FIG. 1 is a perspective illustration of a chopper.

It is generally known to secure wheels by means of fastening elements on wheel axles. Particularly in case of gardening devices, it is desirable to have a simple fastening possibility for the wheels on the wheel axles. FIG. 1 shows a chopper 1 as an embodiment of a gardening device. The chopper 1 has a supply conduit 2 that leads to a chopping device provided within housing 3 and driven by a drive motor, not shown. The chopper 1 has two support legs 4 supported on the ground. Moreover, the chopper 1 has two wheels 5 of which only one is shown in FIG. 1 and which is also supported on the ground in operation of the chopper 1.

Figure 2:
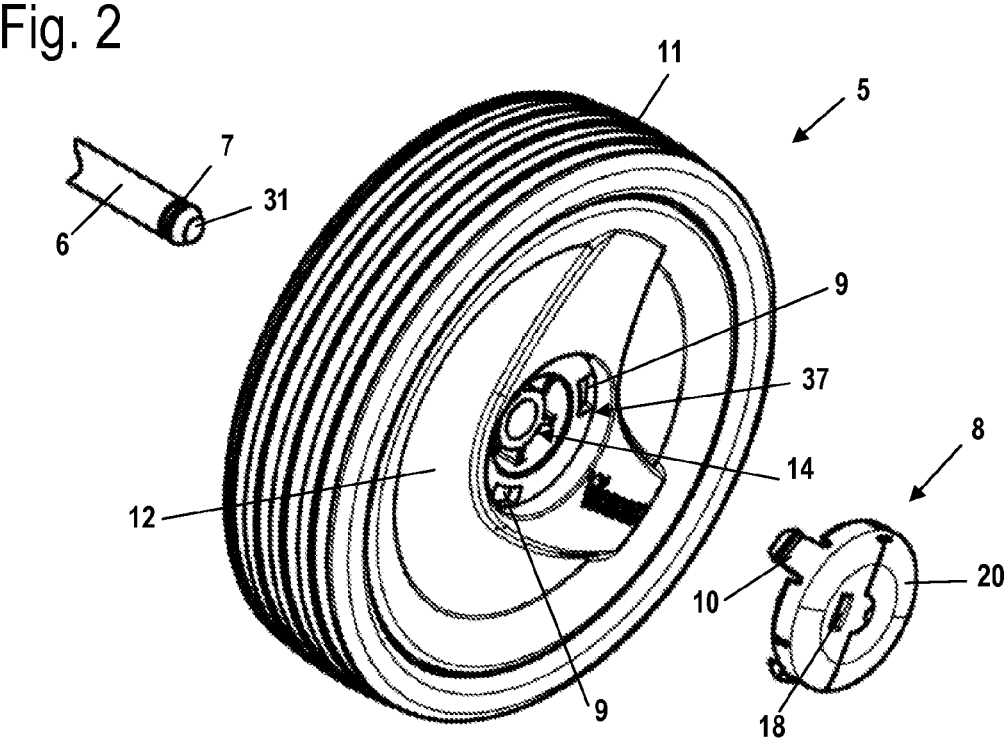
FIG. 2 is a perspective exploded view of the wheel of the chopper showing the outwardly facing side.
Figure 3:
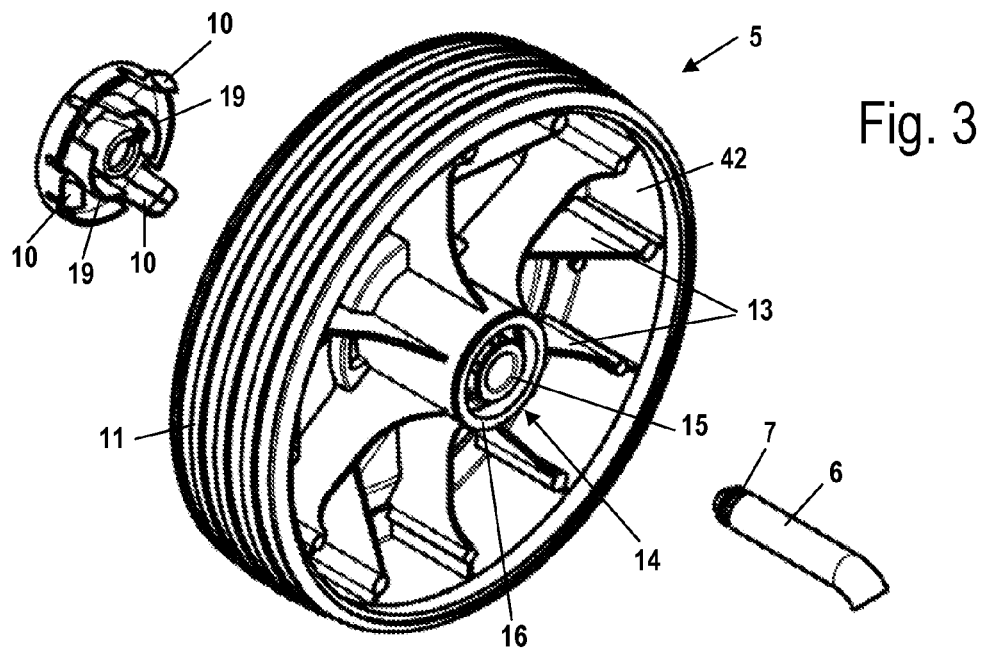
FIG. 3 is another perspective exploded view of the wheel of the chopper showing the opposite inwardly facing side.

FIGS. 2 and 3 show the arrangement of wheel 5, wheel axle 6 and fastening element 8 for fixation of the wheel 5 on the wheel axle 6 in exploded illustration. The wheel axle 6 has adjacent to the end section 31 a groove 7 on which the fastening element 8 can be secured. The fastening element 8 has three locking hooks 10 that are pushed into locking openings 9 of the wheel 5 and are locked therein. The wheel 5 has on its outer circumference a tire 11 that is connected by means of disk 12 to the hub 14 of the wheel 5. The disk 12 forms a substantially closed outer surface with a central recess 37 in which the fastening element 8 can be arranged. The fastening element 8 has an outwardly facing outer wall 20 that is substantially of a closed configuration with the exception of the engagement opening 18. The arrangement of the fastening element 8 in the recess 37 thus provides a substantially closed outer contour of the wheel 5.

As shown in FIG. 3, the wheel 5 has a plurality of reinforcement webs 13 on its inner side that extend from the hub 14 radially in outward direction up to an outer ring 42 that supports the tire 11. The hub 14 has an inner sleeve 15 in which the wheel axle 6 is received as well as an outer sleeve 16 that surrounds the inner sleeve 15 at a spacing.

Figure 4:
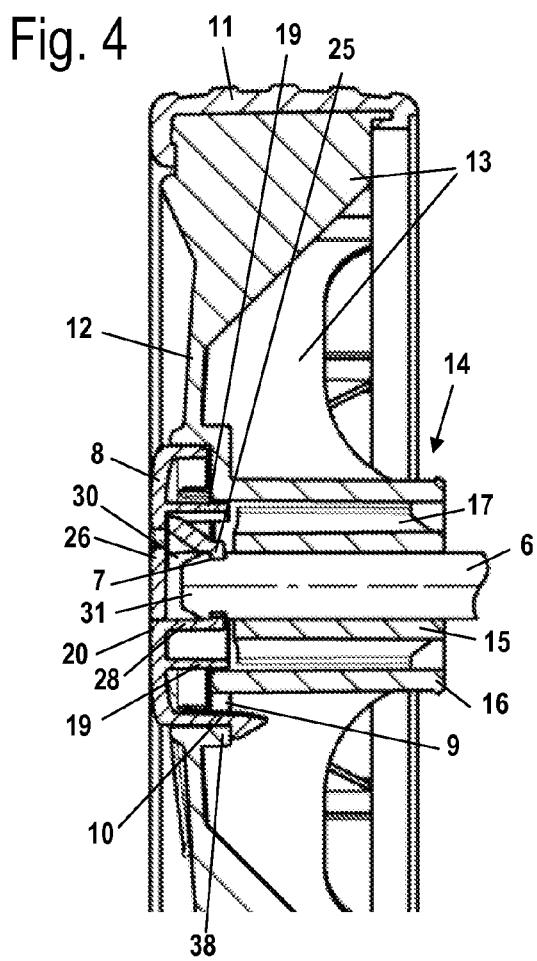
FIG. 4 is a section illustration of the wheel with wheel axle and fastening element.

FIG. 4 shows that between the inner sleeve 15 and the outer sleeve 16 connecting webs 17 are arranged that connect the inner sleeve 15 fixedly with the outer sleeve 16 so as to prevent relative rotation. As also shown in FIG. 4, the fastening element 8 has a locking rim 25 that engages the groove 7 when the wheel 5 is mounted on the wheel axle 6. The locking rim 25 is connected by means of a support wall 28 with the outer wall 20. The end section 31 of the wheel axle 6 projects into receptacle 30 that is provided on the fastening element 8 and is delimited by the support wall 28 and by wheel axle cover 26. The wheel axle cover 26 refers to the section of the outer wall 20 of the fastening element 8 that is arranged at the end face of the wheel axle 6.

Figure 5:
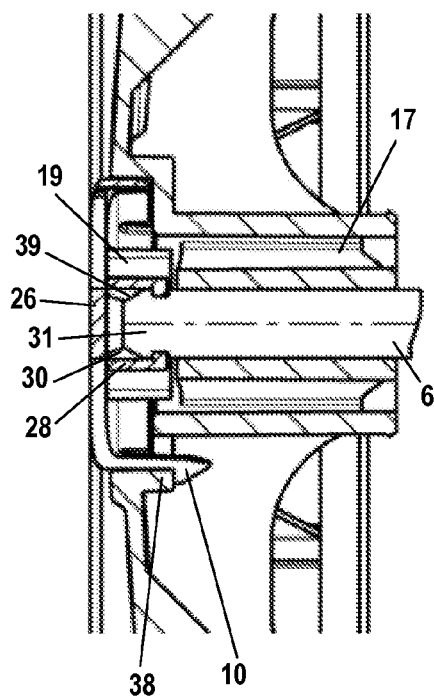
FIG. 5 is another section illustration of the wheel with wheel axle and fastening element in a different section plane.
Figure 6:
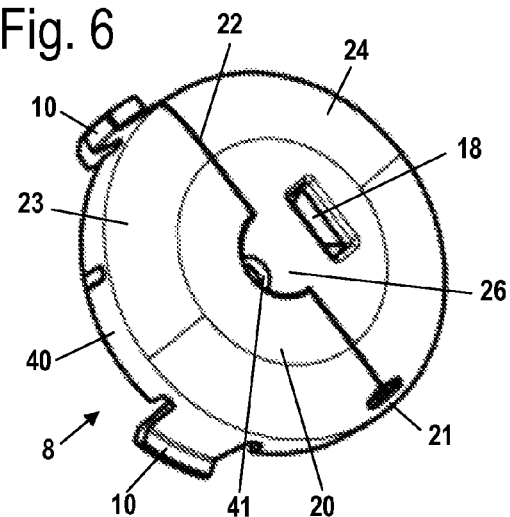
FIG. 6 is a perspective illustration of the fastening element with sections of the fastening element resting against each other.

As shown in FIGS. 3 to 5, the fastening element 8 has two support rims 19 that are of a cylindrical section configuration and project into the outer sleeve 16. In the illustrated embodiment, the inner sleeve 15 ends in front of the support rims 19. FIG. 4 shows also the locking action of the locking hook 10 behind a rim 38 of the disk 12.

For mounting the wheel 5 on the wheel axle 6, first the fastening element 8 is arranged in the recess 37 of the wheel 5 until the locking hooks 10 engage behind the rim 38. Subsequently, the wheel 5 together with the fastening element 8 is pushed onto the wheel axle 6 until the locking rim 25 locks in the groove 7. In order to facilitate assembly, the end section 31 of the wheel axle 6 has a bevel 39. In this way, the fastening element 8 can be pushed more easily onto the wheel axle 6.

FIGS. 6 through 9 show the configuration of the fastening element 8 in detail. The fastening element 8 is comprised of two sections 23 and 24 which abut each other at a plane of separation 22. FIG. 5 shows a section of the fastening element 8 at the plane of separation 22 and FIG. 4 shows a section in a plane that is rotated by 120 degrees relative thereto. As indicated in FIGS. 6 through 9, the two sections 23 and 24 of the fastening element 8 are connected to each other by a hinge section 21. The hinge section 21 is formed like a web and forms a section of the circumferential rim 40 of the fastening element 8 that engages the recess 37 of the wheel 5. As shown in the Figures, a locking hook 10 is divided by the plane of separation 22.

Figure 7:
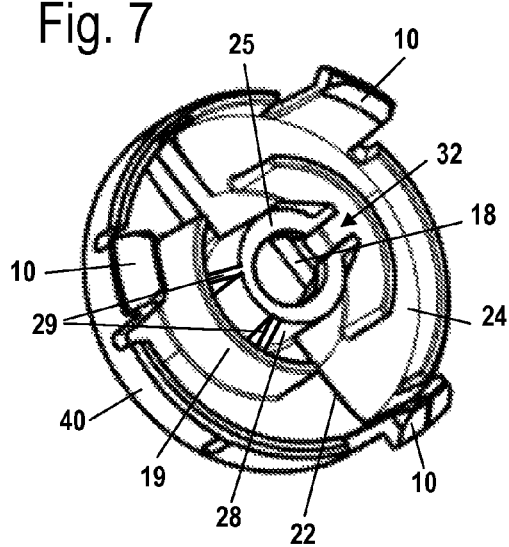
FIG. 7 is another perspective illustration of the fastening element of FIG. 6 with sections of the fastening element resting against each other, showing the opposite side.
Figure 8:
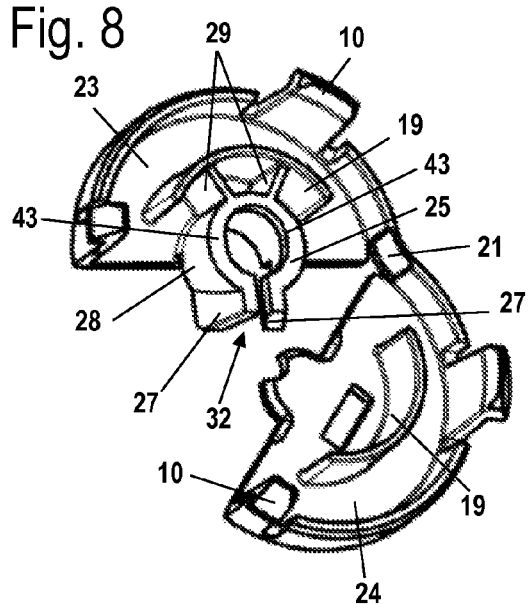
FIG. 8 is a perspective illustration of the fastening element as shown in FIG. 7 where the sections of the fastening element are pivoted away from each other.
Figure 9:
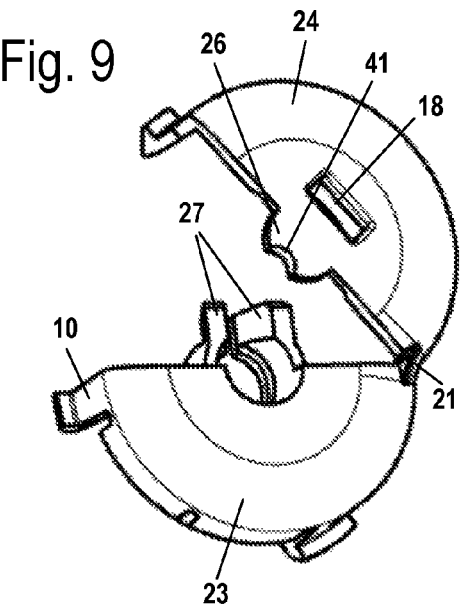
FIG. 9 is another perspective illustration of the fastening element of FIG. 6 with sections of the fastening element being pivoted away from each other.

As shown in FIGS. 7 and 8, the support wall 28 is substantially cylindrically configured and has a slot 32 adjacent to the second section 24. The locking rim 25 extends on the axial end of the support wall 28 approximately perpendicularly to the wheel axle 6. For simplifying mounting and demounting, the inner contour of the locking rim 25 is not of a circular shape but approximately elliptical. Therefore, the inner contour of the locking rim 25 has approximately the shape of a slotted (elongate) hole. The fixation of the fastening element 8 in the groove 7 by means of the locking rim 25 is realized only at the lateral flanks 43 of the locking rim 25, i.e., along the longitudinal sides of the slotted hole formed by the locking rim 25. In the area of the slot 32 and of the oppositely positioned narrow side the locking rim 25 is not resting at the bottom of the groove 7 of the wheel axle 6. In the area of the slot 32 the fastening element 8 is spread open (expanded) for release from the wheel axle 6. The area of the rim 25 opposite the slot 32 is elastically deformed when doing so and forms approximately the pivot point of the two sections of the locking rim 25 and of the support wall 28.

The support wall 28 and the locking rim 25 are exclusively fixed on the first section 23 of the fastening element 8. The slot 32 is formed on the section of the support wall 28 that will rest adjacent to the second section 24 when the two sections 23, 24 are folded toward each other. Adjacent to the slot 32, actuating sections 27 are formed on the support wall 28 and are inclined in the direction toward the outer wall 20 so as to extend away from each other. The actuating sections 27 are positioned directly below the engagement opening 18, as shown in FIG. 7. For release of the fastening element 8 together with the wheel 5 from the wheel axle 6, a tool such as a screwdriver can be inserted into the engagement opening 18 and, by means of this tool, the actuating sections 27 can be spread apart or bent outwardly. In this way, the two lateral flanks 43 of the locking rim 25 are spread apart in outward direction and locking rim 25 is released from the groove 7. The wheel 5 can now be removed together with the fastening element 8 from the wheel axle 6. Subsequently, the fastening element 8 can be removed from the wheel 5 by release of the locking hooks 10 from the inner side of the wheel 5.

As shown in FIG. 8, the support wall 28 of the first section 23 of the fastening element 8 is connected by reinforcement webs 29 to the support rim 19. On this side of the support wall 28 a comparatively stiff configuration of the locking rim 25 results therefore.

As shown in the Figures, the fastening element 8 is of a monolithic configuration. The fastening element 8 is comprised advantageously of plastic material and is produced by an injection molding process. As a result of the configuration of the fastening element 8 with two sections 23 and 24, the wheel axle cover 26 on the second section 24 and the support wall 28 with the actuation section 27 and locking rim 25 on the first section 23 can be produced and removed from the mold by means of a single injection molding process. After the manufacture by injection molding, the two sections 23 and 24 are folded toward each other so that the sections 23 and 24 rests against each other at the plane of separation 22. The wheel axle cover 26 covers the locking rim 25 in a direction perpendicular to the outer wall 20 or in the direction of the wheel axle 6. As a result of the two-leg shape of the fastening element 8 a substantially closed configuration of the outer wall 20 is possible. As shown, for example, in FIGS. 6 and 9, on the wheel axle cover 26 a notch 41 is provided that interrupts the closed outer wall 20 as does the engagement opening 18.

Figure 10:
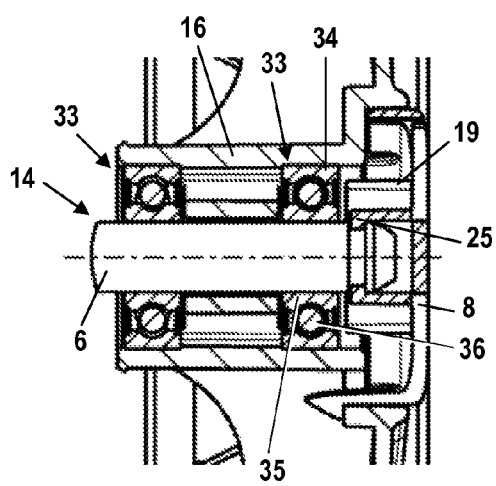
FIG. 10 is a section illustration of an embodiment of the wheel arrangement with fastening element arranged thereat.
Figure 11:
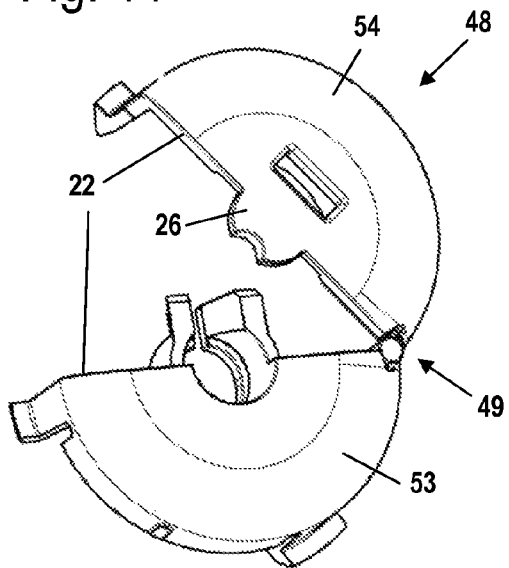
FIG. 11 is a perspective illustration of another embodiment of the fastening element with sections pivoted away from each other.
Figure 12:
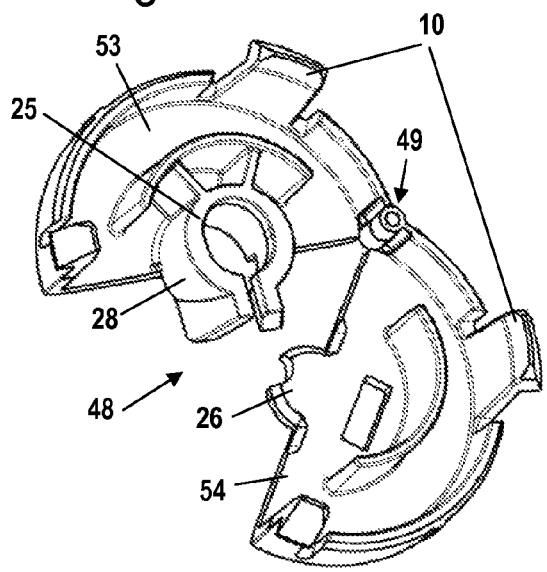
FIG. 12 is a perspective illustration of the embodiment of the fastening element of FIG. 11 with sections pivoted away from each other, showing the opposite side.
Figure 13:
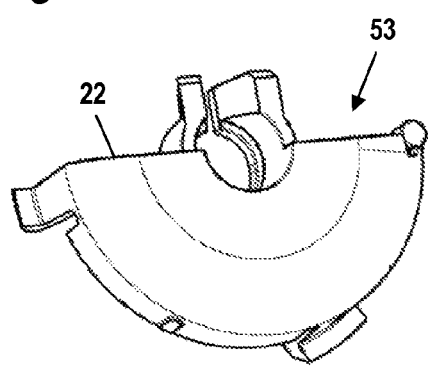
FIG. 13 is a perspective illustration of a first section of the fastening element of FIG. 11 showing the outwardly facing side.

FIG. 10 shows the arrangement of the fastening element 8 on a hub 14 of a wheel 5; the hub 14 has only an outer sleeve 16. In the outer sleeve 16 there are two roller bearings 33 for supporting the wheel 5 on the wheel axle 6. As shown in FIG. 10, the support rib 19 projects in the area of the outer ring 34 of the roller bearings 33 into the outer sleeve 16. In this way, the support rib 19 provides an axial securing action for the roller bearing 33. The locking rim 25 is positioned adjacent to the inner ring 35 and secures the inner ring 35 of the roller bearing 33 in axial direction. The roller bearing 33 has moreover roller bodies 36 that can balls or rollers be, for example, and that roll between the inner ring 35 and the outer ring 34.

Figure 14:
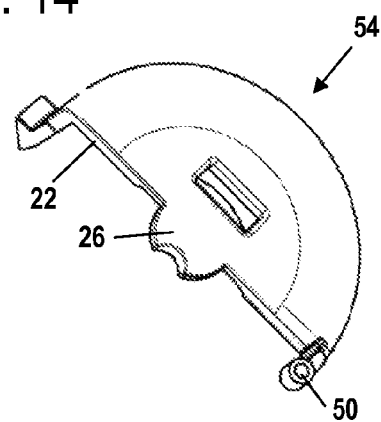
FIG. 14 is a perspective illustration of the second section of the fastening element of FIG. 11 showing the outwardly facing side.
Figure 15:
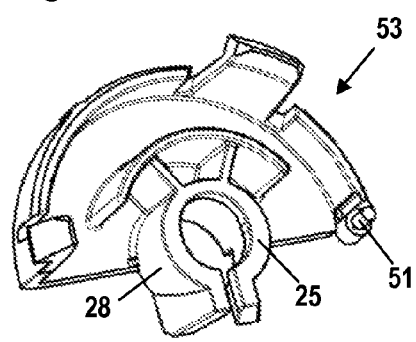
FIG. 15 is a perspective illustration of the first section of the fastening element showing the inwardly facing side.
Figure 16:
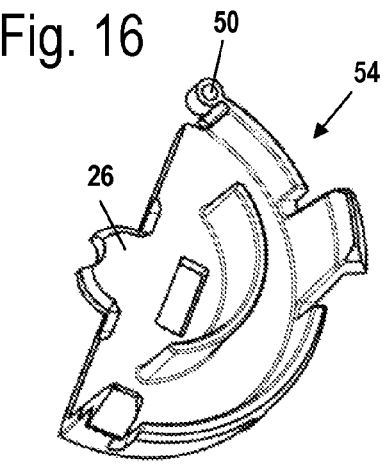
FIG. 16 is a perspective illustration of the second section of the fastening element showing the inwardly facing side.
Figure 17:
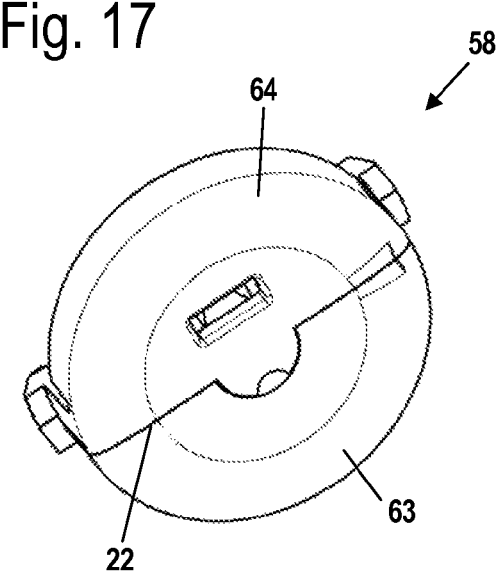
FIG. 17 is a perspective illustration of a further embodiment of the fastening element showing the outwardly facing side.
Figure 18:
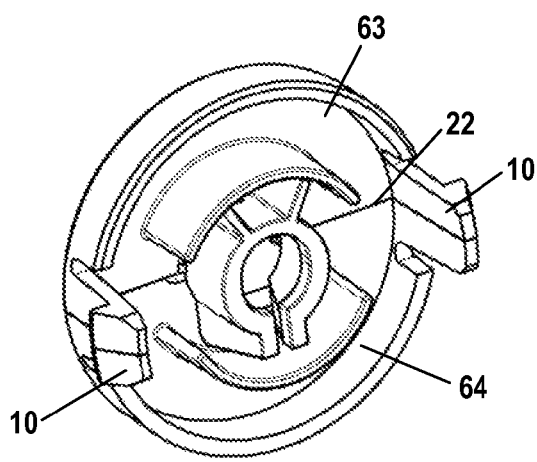
FIG. 18 is a perspective illustration of the fastening element of FIG. 17 showing the inwardly facing side.
Figure 19:
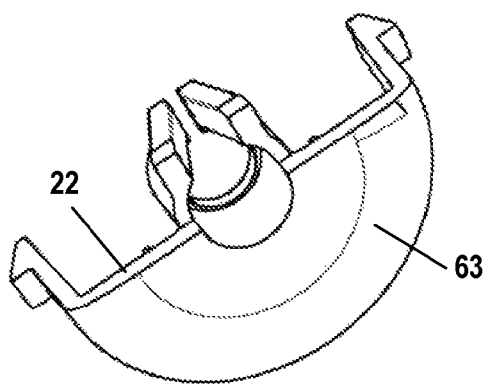
FIG. 19 is a perspective illustration of a first section of the fastening element of FIG. 17 showing the outwardly facing side.
Figure 20:
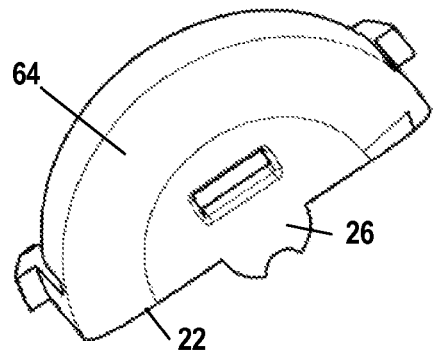
FIG. 20 is a perspective illustration of a second section of the fastening element of FIG. 17 showing the outwardly facing side.

FIGS. 11 to 16 show a further embodiment of a fastening element 48. The fastening element 48 comprises the two sections 53 and 54 that are connected to each other by means of a connecting device in the form of a hinge 49. The further configuration of the fastening element 48 corresponds to the design of the fastening element 8. Same reference characters indicate same elements. As shown in FIGS. 14 and 16, on the second section 54 a receptacle 50 is integrally formed. The pin 51, illustrated in FIG. 15 and formed integrally on the first section 53, can be inserted into the receptacle 50. In this way, the two sections 53 and 54 of the fastening element 48 are pivotably connected to each other. The hinge 49 that is formed by the receptacle 50 and the pin 51 therefore replaces the hinge section 21 of the fastening element 8.

Figure 21:
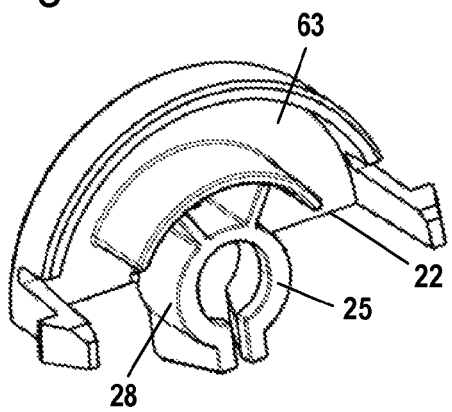
FIG. 21 is a perspective illustration of the first section of the fastening element of FIG. 19 showing the opposite side.
Figure 22:
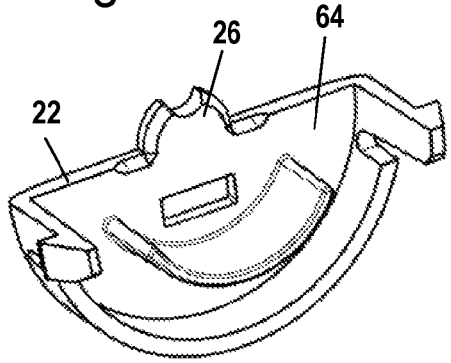
FIG. 22 is a perspective illustration of the second section of the fastening element of FIG. 20 showing the opposite side.
Figure 23:
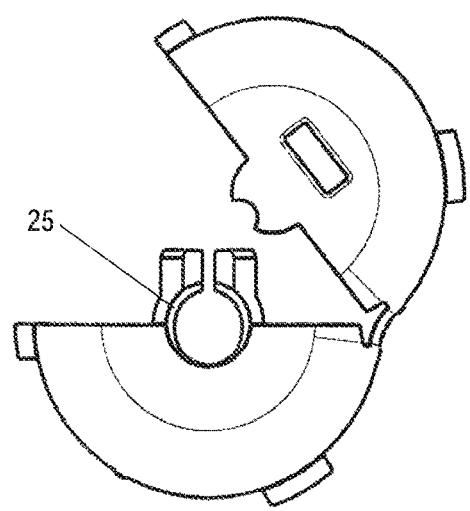
FIG. 23 is a plan view of the fastening element as shown in FIG. 9.

The further embodiment of a fastening element 58 illustrated in FIGS. 17 to 22 has two sections 63 and 64 that are completely separate from each other. The two sections 63 and 64 are loosely resting against each other in the plane of separation 22. It can also be provided that the two sections 63 and 64 are connected to each other, for example, by means of a locking action or by other connecting means such as adhesives or the like. As shown in FIGS. 17 to 22, the fastening element 58 has a total of two locking hooks 10 that are each divided by the plane of separation 22. As shown in FIG. 21, the support wall 28 together with the locking rim 25 that is formed integrally on the first section 63 projects past the plane of separation 22. As shown in FIG. 22, the wheel axle cover 26 on the second section 64 projects past the plane of separation 22 in the direction of the first section 63 of the fastening element 58. Advantageously, the two sections 63 and 64 rest only loosely against each other and are secured relative to each other by being arranged or secured on the wheel 5.

The specification incorporates by reference the entire disclosure of European priority document 10 008 906.9 having a filing date of Aug. 27, 2010.

While specific embodiments of the invention have been shown and described in detail to illustrate the inventive principles, it will be understood that the invention may be embodied otherwise without departing from such principles.

What is claimed is:

1. A fastening element for fixation of a wheel on a wheel axle, said fastening element being a monolithic part and comprising:
   a first section and a second section that are movable relative to each other and are separated from each other by a plane of separation, wherein said first and second sections are connected to each other by an articulation;
   wherein said first section comprises devices for fixation on the wheel axle;
   wherein said second section comprises a wheel axle cover;
   wherein said first and second sections have a first position and in said first position said first and second sections are resting on each other;
   wherein, in said first position, said wheel axle cover covers said devices for fixation on the wheel axle in a direction of the wheel axle;
   wherein said first and second sections have a second position and in said second position said first and second sections are pivoted away from each other; and
   wherein, in said second position, said devices for fixation on the wheel axle and said wheel axle cover are positioned so as to not overlap each other in the direction of the wheel axle.

2. The fastening element according to claim 1, comprising a substantially closed outer wall that is divided by said plane of separation.

3. The fastening element according to claim 2, comprising a locking rim for fixation on a groove of the wheel axle.

4. The fastening element according to claim 3, wherein said wheel axle cover and said locking rim, viewed in a direction perpendicular to said outer wall, overlap at least partially.

5. The fastening element according to claim 3, wherein said locking rim has a substantially elliptical inner contour.

6. The fastening element according to claim 3, comprising a receptacle for receiving an end section of the wheel axle.

7. The fastening element according to claim 6, comprising a support wall that connects said locking rim and said outer wall to each other, wherein said outer wall is provided on said first section.

8. The fastening element according to claim 7, wherein said support wall at least partially delimits said receptacle for the end section of the wheel axle.

9. The fastening element according to claim 7, wherein said support wall has a slot in an area that is adjacent to said second section.

10. The fastening element according to claim 9, wherein said support wall has actuation sections on either side of said slot, wherein said actuation sections are inclined away from each other in a direction relative to said outer wall.

11. The fastening element according to claim 10, wherein said outer wall has an engagement opening adjacent to said actuating sections.

12. The fastening element according to claim 1, comprising at least one locking hook for attaching the fastening element on the wheel.

13. The fastening element according to claim 12, wherein said plane of separation divides said at least one locking hook.

14. A fastening element for fixation of a wheel on a wheel axle, said fastening element comprising:
    a first section and a second section that are movable relative to each other and are separated from each other by a plane of separation;
    wherein said first section comprises devices for fixation on the wheel axle;
    wherein said second section comprises a wheel axle cover;
    a support rim as a stop for an outer ring of a roller bearing.

15. The fastening element according to claim 1 in the form of an injection-molded part of plastic material.

\* \* \* \* \*